US012802694B2

(12) United States Patent
Ragot et al.

(10) Patent No.: US 12,802,694 B2
(45) Date of Patent: Nov. 17, 2026

(54) OPTIMISED CODING OF AN ITEM OF INFORMATION REPRESENTATIVE OF A SPATIAL IMAGE OF A MULTICHANNEL AUDIO SIGNAL

(71) Applicant: Orange, Issy-les-Moulineaux (FR)

(72) Inventors: Stéphane Ragot, Chatillon Cedex (FR); Pierre Clément Mahe, Chatillon Cedex (FR)

(73) Assignee: Orange, Issy-les-Moulineaux (FR)

( * ) Notice: Subject to any disclaimer, the term of this patent is extended or adjusted under 35 U.S.C. 154(b) by 683 days.

(21) Appl. No.: 18/003,806

(22) PCT Filed: Jun. 23, 2021

(86) PCT No.: PCT/FR2021/051144
§ 371 (c)(1),
(2) Date: Dec. 29, 2022

(87) PCT Pub. No.: WO2022/003275
PCT Pub. Date: Jan. 6, 2022

(65) Prior Publication Data

US 2023/0260522 A1 Aug. 17, 2023

(30) Foreign Application Priority Data

Jun. 30, 2020 (FR) ...................................... 2006838

(51) Int. Cl.
*G10L 19/008* (2013.01)
*G10L 19/035* (2013.01)

(52) U.S. Cl.
CPC .......... *G10L 19/008* (2013.01); *G10L 19/035* (2013.01)

(58) Field of Classification Search
None
See application file for complete search history.

(56) References Cited

U.S. PATENT DOCUMENTS 5,751,903 A * 5/1998 Swaminathan ......... G10L 19/18 704/E19.041
6,631,347 B1 * 10/2003 Kim ........................ G10L 19/12 704/219

(Continued)

FOREIGN PATENT DOCUMENTS

FR 2898725 A1 * 9/2007 ........... G10L 19/008
KR 20080104065 A * 11/2008 .............. H03M 7/30

(Continued)

OTHER PUBLICATIONS

P. Mahe, S. Ragot, S. Marchand and J. Daniel, "Ambisonic Coding with Spatial Image Correction," 2020 28th European Signal Processing Conference (EUSIPCO), Amsterdam, Netherlands, 2021, pp. 471-475, doi: 10.23919/Eusipco47968.2020.9287500. (Year: 2020).*

(Continued)

*Primary Examiner* — Richemond Dorvil
*Assistant Examiner* — Alexander G Marlow
(74) *Attorney, Agent, or Firm* — David D. Brush; Westman, Champlin & Koehler, P.A.

(57) ABSTRACT

A method for optimised coding of a multichannel sound signal. The method includes: coding at least one audio signal channel from the original multichannel signal; dividing the original multichannel signal into frequency sub-hands; determining one covariance matrix for each frequency sub-band, representative of a spatial image of the original multichannel signal; decomposing the predetermined covariance matrices into eigenvalues; coding by quantisation of the parameters from the decomposition into eigenvalues including both eigenvalues and eigenvectors. Also provided are a decoding method for decoding the parameters from the decomposition into eigenvalues of the covariance matrix of (Continued)

the original multichannel signal, and coding and decoding devices implementing the respective methods.

16 Claims, 3 Drawing Sheets

(56) References Cited

U.S. PATENT DOCUMENTS

| | | | | |
|---|---|---|---|---|
| 2004/0101048 | A1* | 5/2004 | Paris | G10L 19/008 704/E19.023 |
| 2016/0155448 | A1* | 6/2016 | Purnhagen | G10L 19/0212 704/204 |
| 2016/0261967 | A1* | 9/2016 | Villemoes | G10L 19/002 |

FOREIGN PATENT DOCUMENTS

| | | | | | |
|---|---|---|---|---|---|
| KR | 20110008966 | A * | 1/2011 | | G10L 19/035 |
| WO | WO-2017129546 | A1 * | 8/2017 | | G06N 7/01 |

OTHER PUBLICATIONS

English translation of the Written Opinion of the International Searching Authority dated Sep. 24, 2021 for corresponding International Application No. PCT/FR2021/051144, filed Jun. 23, 2021.
Dai Yang et al., "High-fidelity multichannel audio coding with karhunen-loeve transform," IEEE Transactions on Speech and Audio Processing, IEEE Service Center, New York, NY, US, vol. 11, No. 4, Jul. 1, 2003 (Jul. 1, 2003), p. 365-380, XP011099062.
Pulkki et al., "Parametric Time-Frequency Domain Spatial Audio," IEEE Press Wiley, 2017, pp. 89-159.
Boaz Rafaely, "Fundamentals of Spherical Array Processing," Springer Topics in Signal Processing, Springer, vol. 8, 2015.
"3rd Generation Partnership Project; Technical Specification Group Services and System Aspects; Objective test methodologies for the evaluation of immersive audio systems (Release 15)," Technical Specification, 3GPP TS 26.260 V15.2.0 (Mar. 2020).
"3rd Generation Partnership Project; Technical Specification Group Services and System Aspects; Virtual Reality (VR) media services over 3GPP (Release 15)," Technical Report, 3GPP TR 26.918 V15.2.0 (Mar. 2018) (see clause 6.1.6.3).
K. Shoemake, "Animating Rotation with Quaternion Curves ," The Singer Company, Link Flight Simulation Division, Siggraph, '85, p. 245-254, vol. 19, No. 3, San Francisco, Jul. 22-26, 1985.
P. Mahé et al., "First-Order Ambisonic Coding with quaternion-based interpolation of PCA rotation matrices", EAA Spatial Audio Signal Processing Symposium, Sep. 2019, Paris, France, pp. 7-12, 10.25836/sasp.2019.19, hal-02275181.
Paul Bourke, "HyperSpace, User Manual," Dec. 1990, lines 2-7201.
"3rd Generation Partnership Project; Technical Specification Group Services and System Aspects; Subjective test methodologies for the evaluation of immersive audio systems (Release 15)," Technical Specification, 3GPP TS 26.259 V15.0.0 (Sep. 2018) (see Figure 2).
D.K. Hoffman, et al., "Generalization of Euler Angles to N-Dimensional Orthogonal Matrices," Journal of Mathematical Physics, vol. 13, No. 4, pp. 528-533, 1972.
C. Lamblin and J.-P. Adoul, "Spherical vector quantization algorithm based on 8th-order Gosset network," Ann. Telecommunications, vol. 43, No. 3-4, pp. 172-186, 1988 (Lamblin, 1988).
"Digital terminal equipments—Coding of analogue signals by methods other than PCM," Series G: Transmission Systems and Media, Digital Systems and Networks. International Telecommunications Union, Telecommunication Standardization Sector of ITU, ITU-T Recommendation G.729.1 (May 2006) (see clause 6.6.9).
JM. Valin et al., "Definition of the Opus Audio Codec," Memo, Internet Engineering Task Force (IETF), Request for Comments: 6716, ISSN: 2070-1721, Sep. 2012.
Wikipedia contributors, "Ambisonic data exchange formats," Wikipedia, The Free Encyclopedia. Wikipedia, The Free Encyclopedia, Nov. 3, 2023.
International Search Report dated Sep. 24, 2021 for corresponding International Application No. PCT/FR2021/051144, filed Jun. 23, 2021.
Written Opinion of the International Searching Authority dated Sep. 24, 2021 for corresponding International Application No. PCT/FR2021/051144, filed Jun. 23, 2021.

* cited by examiner

OPTIMISED CODING OF AN ITEM OF INFORMATION REPRESENTATIVE OF A SPATIAL IMAGE OF A MULTICHANNEL AUDIO SIGNAL

CROSS-REFERENCE TO RELATED APPLICATIONS

This application is a Section 371 National Stage Application of International Application No. PCT/FR2021/051144, filed Jun. 23, 2021, which is incorporated by reference in its entirety and published as WO 2022/003275 A1 on Jan. 6, 2022, not in English.

FIELD OF THE DISCLOSURE

The present invention relates to the coding/decoding of spatialized sound data, in particular in an ambiophonic context (hereinafter also denoted "ambisonic").

BACKGROUND OF THE DISCLOSURE

Encoders/decoders (hereinafter called "codecs") that are currently used in mobile telephony are mono (a single signal channel to be rendered on a single loudspeaker). The 3GPP EVS (for "Enhanced Voice Services") codec makes it possible to offer "Super-HD" quality (also called "High Definition Plus" or HD+ voice) with a super-wideband (SWB) audio band for signals sampled at 32 or 48 kHz or full band (FB) audio band for signals sampled at 48 kHz; the audio bandwidth is 14.4 to 16 kHz in SWB mode (9.6 to 128 kbit/s) and 20 kHz in FB mode (16.4 to 128 kbit/s).

The next quality evolution in conversational services offered by operators should consist of immersive services, using terminals such as smartphones equipped with multiple microphones or remote presence or 360° video spatialized audio-conferencing or video-conferencing equipment, or even "live" audio content sharing equipment, with spatialized 3D sound rendering that is much more immersive than simple 2D stereo rendering. With the increasingly widespread use of listening on a mobile telephone with an audio headset and the onset of advanced audio equipment (accessories such as a 3D microphone, voice assistants with acoustic antennas, virtual reality headsets, etc.), capturing and rendering spatialized sound scenes is now widespread enough to offer an immersive communication experience.

To this end, the future 3GPP standard "IVAS" (for "Immersive Voice And Audio Services") is proposing to extend the EVS codec to immersive audio by accepting, as codec input format, at least the spatialized sound formats listed below (and their combinations):

- stereo or 5.1 multichannel format (channel-based), in which each channel feeds a loudspeaker (for example L and R in stereo or L, R, Ls, Rs and C in 5.1);
- object format (object-based), in which sound objects are described as an audio signal (generally mono) associated with metadata describing the attributes of this object (position in space, spatial width of the source, etc.),
- ambisonic format (scene-based), which describes the sound field at a given point, generally captured by a spherical microphone or synthesized in the domain of spherical harmonics.

What is typically of interest below is the coding of a sound in the ambisonic format, by way of exemplary embodiment (at least some aspects presented in connection with the invention below possibly also being able to apply to formats other than ambisonics).

Ambisonics is a method for recording ("coding" in the acoustic sense) spatialized sound and a reproduction system ("decoding" in the acoustic sense). A (1st-order) ambisonic microphone comprises at least four capsules (typically of cardioid or sub-cardioid type) arranged on a spherical grid, for example the vertices of a regular tetrahedron. The audio channels associated with these capsules are called the "A-format". This format is converted into a "B-format", in which the sound field is decomposed into four components (spherical harmonics) denoted W, X, Y, Z, which correspond to four coincident virtual microphones. The component W corresponds to omnidirectional capturing of the sound field, while the components X, Y and Z, which are more directional, are similar to pressure gradient microphones oriented along the three orthogonal axes of space. An ambisonic system is a flexible system in the sense that recording and rendering are separate and decoupled. It allows decoding (in the acoustic sense) on any configuration of loudspeakers (for example binaural, 5.1 or 7.1.4 periphonic (with elevation) "surround" sound). The ambisonic approach may be generalized to more than four channels in B-format, and this generalized representation is commonly called "HOA" (for "Higher-Order Ambisonics"). Decomposing the sound into more spherical harmonics improves the spatial rendering precision when rendering on loudspeakers.

An Mth-order ambisonic signal comprises $K=(M+1)^2$ components and, in the 1st order (if M=1), there are the four components W, X, Y, and Z, commonly called FOA (for First-Order Ambisonics). There is also what is called a "planar" variant of ambisonics (W, X, Y), which decomposes the sound defined in a plane that is generally the horizontal plane (where Z=0). In this case, the number of components is K=2M+1 channels. 1st-order ambisonics (4 channels: W, X, Y, Z), planar 1st-order ambisonics (3 channels: W, X, Y) and higher-order ambisonics are all referred to below indiscriminately as "ambisonics" for ease of reading, the processing operations that are presented being applicable independently of the planar or non-planar type and the number of ambisonic components. Hereinafter, "ambisonic signal" will be the name given to a predetermined-order signal in B-format with a certain number of ambisonic components. This also comprises hybrid cases, in which for example there are only 8 channels (instead of 9) in the 2nd order—more precisely, in the 2nd order, there are the 4 1st-order channels (W, X, Y, Z) plus normally 5 channels (usually denoted R, S, T, U, V), and it is possible for example to ignore one of the higher-order channels (for example R).

The signals to be processed by the encoder/decoder take the form of successions of blocks of sound samples called "frames" or "sub-frames" below.

Furthermore, below, mathematical notations follow the following convention:

- Scalar: s or N (lower-case for variables or upper-case for constants)
- the operator Re(.) denotes the real part of a complex number
- Vector: u (lower-case, bold)
- Matrix: A (upper-case, bold)

The notations $A^T$ and $A^H$ indicate, respectively, the transposition and the Hermitian transposition (transposed and conjugated) of A.

- A one-dimensional discrete-time signal, s(i), defined over a time interval i=0, . . . , L−1 of length L is represented by a row vector $$S=[s(0), \ldots, s(L-1)].$$

It is also possible to write: $s=[s_0, \ldots, s_{L-1}]$ to avoid using parentheses.

A multidimensional discrete-time signal, b(i), defined over a time interval i=0, . . . , L−1 of length L and with K dimensions is represented by a matrix of size L×K:

$$B = \begin{bmatrix} b_0(0) & \ldots & b_0(L-1) \\ \vdots & \ldots & \vdots \\ b_{K-1}(0) & \ldots & b_{K-1}(L-1) \end{bmatrix}.$$

It is also possible to denote: $B=[B_{ij}]$, i=0, . . . K−1, j=0 . . . L−1, to avoid using parentheses.

Cartesian coordinates (x,y,z) of a 3D point may be converted into spherical coordinates (r, θ, ϕ), where r is the distance to the origin, θ is the azimuth and φ is the elevation. Use is made here, without loss of generality, of the mathematical convention in which elevation is defined with respect to the horizontal plane (0xy); the invention may easily be adapted to other definitions, including the convention used in physics in which the azimuth is defined with respect to the axis Oz.

Moreover, no reminder is given here of the conventions known from the prior art in ambisonics regarding the order of the ambisonic components (including ACN for Ambisonic Channel Number, SID for Single Index Designation, FuMA for Furse-Malham) and the normalization of ambisonic components (SN3D, N3D, maxN). More details may be found for example in the resource available online:

https://en.wikipedia.org/wiki/Ambisonic_data_exchange_ formats

By convention, the first component of an ambisonic signal generally corresponds to the omnidirectional component W.

The simplest approach for coding an ambisonic signal consists in using a mono encoder and applying it in parallel to all channels with possibly a different bit allocation depending on the channels. This approach is called "multi-mono" here. The multi-mono approach may be extended to multi-stereo coding (in which pairs of channels are coded separately by a stereo codec) or more generally to the use of multiple parallel instances of the same core codec.

Since the multi-mono coding approach does not take into account inter-channel correlation, it produces spatial deformations with the addition of various artifacts, such as the appearance of ghost sound sources, diffuse noises or displacements of sound source trajectories. Coding an ambisonic signal using this approach thus leads to degradations of the spatialization.

One alternative approach to separately coding all of the channels is given, for a stereo or multichannel signal, by parametric coding. For this type of coding, the input multichannel signal is reduced to a smaller number of channels, after a processing operation called a "downmix", these channels are coded and transmitted and additional spatialization information is also coded. Parametric decoding consists in increasing the number of channels after decoding the transmitted channels, using a processing operation called an "upmix" (typically implemented through decorrelation) and a spatial synthesis based on the decoded additional spatialization information.

One example of stereo parametric coding is given by the 3GPP e-AAC+ codec.

One example of parametric coding for ambisonics is given by the DirAC (for "Directional Audio Coding") codec, of which there are multiple variants for 1st-order or higher-order coding. At order 1 (4 channels W, X, Y, Z), the DirAC method may take the signal W as a "downmix" signal and applies, to the input ambisonic signal, a time/frequency analysis to estimate two parameters per sub-band: the direction of the main source and the diffuse character of the scene. This is achieved by computing the active intensity vector at the time/frequency interval of index (n,f), to within a normalization constant:

$$I(n, f) = \begin{bmatrix} \mathrm{Re}(W(n, f)X^*(n, f)) \\ \mathrm{Re}(W(n, f)Y^*(n, f)) \\ \mathrm{Re}(W(n, f)Z^*(n, f)) \end{bmatrix}$$

where * is the Hermitian conjugate, Re(.) corresponds to the real part. The direction of arrival (DoA) of the source is estimated from the intensity vector:

$$DOA(n,f)=\angle\mathbb{E}[-I(n,f)]$$

Where ∠ gives the angle of the 3D vector and $\mathbb{E}$ gives the mathematical expectation, and the diffuse character of the scene is estimated using a "diffuseness" parameter, defined for example as:

$$\psi(n) = \sqrt{1 - \frac{\|\mathbb{E}[I]\|}{\mathbb{E}[\|I\|]}}$$

where ||.|| is the complex modulus.

In the case of higher ambisonic orders, the DirAC method divides the sound space into sectors $S_m$, corresponding to a portion of the sphere (unit). For each sector $S_m$, a directional beamforming processing operation extracts 3 channels $X_m$, $Y_m$, $Z_m$, and an "omni" channel corresponding to the sum of the 3 channels, called $W_m$. Similarly to the 1st-order DirAC method, for each sector, the signal is coded with the spatialization parameters per sub-band (DoA and diffuseness). For more details, reference is made to the work by V. Pulkki et al, Parametric time-frequency domain spatial audio, Wiley, 2017, pp. 89-159.

The "downmix" operation in existing parametric coding methods leads to degradations in the spatialization and modifications of the spatial image of the original signal.

The DirAC approach described above seeks to re-spatialize one or more sources in space, with a limitation on the maximum number of sources.

The reproduction of the sound scene upon decoding is then not always optimum.

There is therefore a need to recover, upon decoding, a sound scene close to the original sound scene while at the same time optimizing the coding rate.

A "spatial image" is understood here to mean a distribution of the sound energy of the ambisonic sound scene in various directions in space; the spatial image describes the sound scene and it generally corresponds to positive values evaluated in various predetermined directions in space—these positive values may be interpreted as energies and are seen as such hereinafter.

A spatial image associated with an ambisonic sound scene therefore represents the sound energy (or more generally a positive value) as a function of various directions in space. Information representative of a spatial image may be for example a covariance matrix computed between the channels of the multichannel signal or else energy information associated with directions from which the sound originates (associated with directions of virtual loudspeakers distributed over a unit sphere).

The energy information may be obtained in various directions (associated with directions of virtual loudspeakers distributed over a unit sphere). For this purpose, various spatial image computation methods known to those skilled in the art may be used: SRP (for "Steered-Response Power") method, MUSIC pseudo-spectrum, histogram of directions of arrival, etc.

In general, the representation of a spatial image in the form of a covariance matrix involves coding a matrix of size K×K with K(K+1)/2 non-redundant coefficients. The energy information requires coding at least the energy in N=K discrete points distributed over a sphere; in practice, a higher number of points (N>>K) should be defined in order to have a sufficiently precise and usable representation.

The problem of the coding of a covariance matrix is therefore of more particular interest here. The approach known from the prior art is for example described in the article by Dai Yang et al., High-Fidelity Multichannel Audio Coding with Karhunen-Loève Transform, IEEE Trans. Speech and Audio Processing, vol. 11, no 4, July 2003.

A covariance matrix of size K×K is coded by coding K(K+1)/2 values (corresponding to the lower or upper triangle—the matrix being symmetric) with a 16-bit floating-point representation (per coefficient). For example, if a single matrix of size 4×4 (K=4 for the FOA) is coded per 20 ms frame, this corresponds to a rate of 16×10 bits/20 ms=8 kbit/s. If multiple covariance matrices are transmitted per frame, this rate becomes very high.

SUMMARY

The invention aims to improve the prior art.

To this end, the invention targets a method for coding a multichannel sound signal, comprising the following steps:

- coding at least one audio signal channel originating from the original multichannel signal;
- dividing the original multichannel signal into frequency sub-bands;
- determining a covariance matrix per frequency sub-band, representative of a spatial image of the original multichannel signal;
- decomposing the determined covariance matrices into eigenvalues;
- coding by quantizing the parameters resulting from the decomposition into eigenvalues comprising both eigenvalues and eigenvectors.

Coding the covariance matrices per frequency band, of the original multichannel signal will thus allow the decoder to reconstruct the sound scene as close as possible to that of the original signal by applying corrections to the transmitted signals.

Decomposing the covariance matrices into eigenvalues and coding parameters resulting from this decomposition makes it possible to restrict the amount of information to be transmitted to the decoder and thus to optimize the coding rate of these parameters and to reduce the distortion for a given budget.

According to one embodiment of the invention, the coding method makes it possible to decompose the K(K+1)/2 degrees of freedom into two portions on which more efficient coding is possible: K(K−1)/2 degrees of freedom (eigenvectors in the form of a rotation matrix in dimension K)+K degrees of freedom (eigenvalues). Typically, this gives a rate of the order of 2.5 kbit/s for the example of a 4×4 matrix and 20 ms frames.

In one embodiment, the eigenvalues are ordered before quantization and the quantization is performed by a differential scalar quantization.

The coding rate is thus further reduced to quantize these eigenvalues.

According to a first embodiment, a covariance matrix is decomposed into eigenvalues using the following steps:

- obtaining a matrix of eigenvectors Q such that $C=Q\Lambda Q^T$, where C is the covariance matrix and $\Lambda=\mathrm{diag}(\lambda_1, \ldots, \lambda_K)$ is a diagonal matrix of eigenvalues;
- modifying the matrix of eigenvectors as a function of a determinant value of the matrix of eigenvectors Q;
- converting the matrix of eigenvectors Q into the domain of generalized Euler angles;

the generalized Euler angles that are obtained forming part of the parameters to be quantized.

The conversion into the domain of Euler angles makes it possible to quantize the angles resulting from this conversion in order to code the matrix of eigenvectors, thereby making it possible to reduce the coding rate for a given distortion or to reduce the distortion for a given rate. The quantization, for this first embodiment, is of lower complexity.

Therefore, in one particular embodiment, the generalized Euler angles are quantized by uniform quantization.

According to a second embodiment, a covariance matrix is decomposed into eigenvalues using the following steps:

- obtaining a matrix of eigenvectors Q such that $C=Q\Lambda Q^T$, where C is the covariance matrix and $\Lambda=\mathrm{diag}(\lambda_1, \ldots, \lambda_K)$ is a diagonal matrix of eigenvalues;
- modifying the matrix of eigenvectors as a function of a determinant value of the matrix of eigenvectors Q;
- converting the matrix of eigenvectors Q into the domain of quaternions;

at least one quaternion that is obtained forming part of the parameters to be quantized.

The conversion into the domain of quaternions makes it possible to quantize the quaternions resulting from this conversion in order to code the matrix of eigenvectors, thereby making it possible to reduce the coding rate for a given distortion or to reduce the distortion for a given rate. For this second embodiment, the quantization has a greater complexity but the spherical vector quantization used to quantize these parameters is more efficient than a scalar quantization.

Therefore, in one particular embodiment, the quaternions are quantized by spherical vector quantization.

The invention also relates to a method for decoding a multichannel sound signal, comprising the following steps:

- decoding at least one coded channel and obtaining a decoded multichannel signal;
- dividing the decoded multichannel signal into frequency sub-bands;
- decoding parameters resulting from a decomposition of covariance matrices of the original multichannel signal into eigenvalues;
- determining the covariance matrices of the original multichannel signal from the decoded parameters:
- determining a covariance matrix, per frequency sub-band, of the decoded multichannel signal;
- determining a set of corrections to be made to the decoded signal based on the covariance matrices of the original multichannel signal (Inf. B) and the covariance matrices of the decoded multichannel signal (Inf. $\hat{B}$);

correcting the decoded multichannel signal using the determined set of corrections.

The decoder is thus able to receive and decode the covariance matrices of the original multichannel signal with reduced distortion for a given rate compared with conventional methods using direct coding of the covariance matrix. These decoded covariance matrices then make it possible to determine corrections to be made to the decoded multichannel signal so that the spatial image of the decoded multichannel signal is as close as possible to the spatial image of the original multichannel signal.

The invention also relates to a coding device comprising a processing circuit for implementing the coding method as described above.

The invention also relates to a decoding device comprising a processing circuit for implementing the decoding method as described above.

The invention relates to a computer program comprising instructions for implementing the coding or decoding methods as described above when they are executed by a processor.

The invention relates lastly to a storage medium, able to be read by a processor, storing a computer program comprising instructions for executing the coding or decoding methods described above.

BRIEF DESCRIPTION OF THE DRAWINGS

Other features and advantages of the invention will become more clearly apparent on reading the following description of particular embodiments, which are provided by way of simple illustrative and non-limiting examples, and of the appended drawings, in which.

DETAILED DESCRIPTION OF ILLUSTRATIVE EMBODIMENTS

Figure 1:
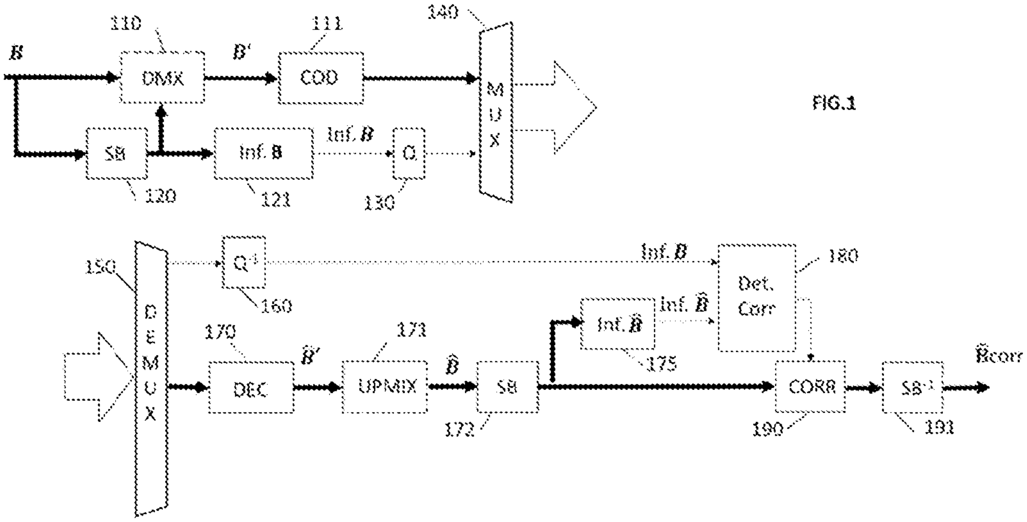
FIG. 1 illustrates one embodiment of an encoder and a decoder, a coding method and a decoding method according to the invention.

A reminder is given here of the known technique for encoding (in the acoustic sense) a sound source in the ambisonic format. A mono sound source may be artificially spatialized by multiplying the associated signal by the values of the spherical harmonics associated with its direction of origin (assuming the signal is carried by a plane wave) in order to obtain the same number of ambisonic components. This involves computing the coefficients for each spherical harmonic for a position determined in azimuth θ and in elevation ϕ in the desired order:

$$B=Y(\theta,\varphi)\cdot s$$

where s is the mono signal to be spatialized and Y(θ, ϕ) is the encoding vector defining the coefficients of the spherical harmonics associated with the direction (θ, ϕ) for the Mth order. One example of an encoding vector is given below for the 1st order with the SN3D convention and the order of the SID or FuMa channels:

$$Y(\theta,\varphi)=\begin{bmatrix}1\\ \cos\theta\cos\varphi\\ \sin\theta\cos\varphi\\ \sin\varphi\end{bmatrix}$$

Other normalization conventions (for example: maxN, N3D) and channel orders (for example: ACN) exist, and the various embodiments are then adapted according to the convention used for the order or the normalization of the ambisonic components (FOA or HOA). This is tantamount to modifying the order of the rows Y(θ, φ) or multiplying these rows by predefined constants.

For higher orders, the coefficients Y(θ, ϕ) of the spherical harmonics may be found in the book by B. Rafaely, Fundamentals of Spherical Array Processing, Springer, 2015. In general, for an order M, there are $K=(M+1)^2$ ambisonic signals.

Likewise, a reminder will be given here of a few concepts regarding ambisonic rendering by loudspeakers. An ambisonic sound is not meant to be listened to as such; for immersive listening on loudspeakers or on headphones, a “decoding” step in the acoustic sense, also called rendering (“renderer”), has to be carried out. Consideration is given to the case of N (virtual or physical) loudspeakers distributed over a sphere—typically with a unit radius—and whose directions $(\theta_n, \phi_n)$, n=0, . . . , N−1, in terms of azimuth and elevation, are known. Decoding, as considered here, is a linear operation that consists in applying a matrix D to the ambisonic signals B in order to obtain the signals $s_n$ of the loudspeakers, which may be combined into a matrix $S=[s_0, \ldots, s_{N-1}]$, S=D·B, where $$S=\begin{bmatrix}s_0\\ \vdots\\ s_{N-1}\end{bmatrix}.$$

The matrix D may be decomposed into row vectors $d_n$, that is to say $$D=\begin{bmatrix}d_0\\ \vdots\\ d_{N-1}\end{bmatrix}$$

$d_n$ may be seen as a weighting vector for the nth loudspeaker, used to recombine the components of the ambisonic signal and compute the signal played on the nth loudspeaker: $s_n=d_n\cdot B$.

There are multiple methods for “decoding” in the acoustic sense. What is known as the “basic decoding” method, also called “mode-matching”, is based on the encoding matrix E associated with all of the directions of virtual loudspeakers:

$$E=[Y(\theta_0,\varphi_0)\ \ldots\ Y(\theta_{N-1},\varphi_{N-1})]$$

According to this method, the matrix D is typically defined as the pseudo-inverse of E:

$$D=\text{pinv}(E)=D^T(D\cdot D^T)^{-1}$$

As an alternative, the method that may be called the "projection" method gives similar results for certain regular distributions of directions, and is described by the equation:

$$D = \frac{1}{N} E^T$$

In the latter case, it may be seen that, for each direction of index n, $$d_n = \frac{1}{N} Y(\theta_n, \varphi_n)^T$$

In the context of this invention, such matrices will serve as a directional beamforming matrix that describes how to obtain signals characteristic of directions in space in order to perform an analysis and/or spatial transformations.

In the context of the present invention, it is useful to describe the reciprocal conversion for passing from the loudspeaker domain to the ambisonic domain. The successive application of the two conversions should exactly reproduce the original ambisonic signals if no intermediate modification is applied in the loudspeaker domain. The reciprocal conversion is therefore defined as bringing into play the pseudo-inverse of D:

$$\mathrm{pinv}(D)\cdot S = D_T(D\cdot D_T)^{-1}\cdot S$$

When $K=(M+1)^2$, the matrix D of size K×K is able to be inverted under certain conditions and, in this case: $B=D^{-1}\cdot S$ In the case of the "mode-matching" method, it appears that pinv(D)=E. In some variants, other methods for decoding using D may be used, with the corresponding inverse conversion E; the only condition to be met is that the combination of the decoding using D and the inverse conversion using E should give a perfect reconstruction (when no intermediate processing operation is performed between the acoustic decoding and the acoustic encoding).

Such variants are for example given by:

"mode-matching" decoding, with a regulation term in the following form $D^T(D\cdot D^T+\varepsilon_D I)^{-1}$ where $\varepsilon_D$ is a low value (for example 0.01), "in phase" or "max-rE" decoding, known from the prior art or variants in which the distribution of the directions of the loudspeakers is not regular over the sphere.

The method described below is based on transmitting a spatial image representation in the form of a covariance matrix and correcting spatial degradations, in particular to ensure that the spatial image of the decoded signal is as close as possible to the original signal. Unlike known parametric coding approaches for stereo or multichannel signals, in which perceptual cues are coded, the invention is not based on a perceptual interpretation of spatial image information, since the ambisonic domain is not directly "hearable".

In the embodiment described below, coding is carried out, with an optional downmix/upmix using a map, hereinafter called spatial image of the original ambisonic sound scene. Upon coding, a certain number of channels (preferably lower than the number of input channels) are transmitted to the decoder. These channels may be a subset of the original channels (for example: W or X channel, 4 channels of the 3D FOA, 3 channels of the planar FOA, etc.) or a re-mastering of the input channels (for example: stereo downmix resulting from an FOA input). In addition to these channels, the encoder transmits information resulting from a map of the original sound scene. This information may be defined on a signal on a single frequency band (for example: 0-16000 or 100-14000 Hz for a signal sampled at 32 kHz) but, in the preferred embodiment, the spectrum is divided into sub-bands (which may be derived from existing Bark or Mel divisions or other divisions, as described later). According to one embodiment of the invention, the spatial image of the original sound scene is a covariance matrix as defined later. Optimized coding of this covariance matrix is provided in order to optimize the coding rate of this representation of a spatial image, especially when it is defined by sub-bands.

Upon decoding, the received and decoded signals are optionally extended by an "upmix" (by decorrelation), described below. Depending on the type of information received, a map of the "degraded" sound scene is produced. A transformation operation is determined in order to recreate the original sound scene. This transformation is determined at the decoder based on the received and decoded original map (information from the spatial image of the original signal) and on the degraded map (information from the spatial image of the decoded multichannel signal).

In some variants, the downmix/upmix may be replaced by direct coding of the channels, for example multimono or multistereo.

FIG. 1 shows one exemplary embodiment of an encoder and a decoder according to the invention for implementing, respectively, the coding and decoding methods according to one embodiment of the invention.

The original multichannel signal B of dimension K×L (that is to say K components of L time or frequency samples) is at the input of the encoder.

What is of interest here is the case of a multichannel signal with an ambisonic representation, as described above. The invention may also be applied to other types of multichannel signal, such as a B-format signal with modifications, such as for example the suppression of certain components (for example: suppression of the 2nd-order R component so as to keep only 8 channels) or the matrixing of the B-format in order to pass to an equivalent domain (called "Equivalent Spatial Domain") as described in the 3GPP TS 26.260 specification—another example of matrixing is given by "channel mapping 3" of the IETF Opus codec and in the 3GPP TS 26.918 specification (clause 6.1.6.3).

In the embodiment thus described, the input signal is sampled at 32 kHz. The encoder operates in frames that are preferably 20 ms long, that is to say L=640 samples per frame at 32 kHz. In some variants, other frame lengths and sampling frequencies are possible (for example L=480 samples per frame of 10 ms at 48 kHz).

In one preferred embodiment, the spatial image is coded in sub-bands in the frequency domain after a temporal short-term discrete Fourier transform (STFT) (on one or more bands), but, in some variants, the invention may be implemented in sub-bands by applying a real or complex filter bank to process sub-bands in the time domain, or using another type of transform such as the modified discrete cosine transform (MDCT) or the Modulated Complex Lapped Transform (MCLT).

A block 110 for reducing the number of channels (DMX) is optionally implemented. This consists for example, for a 1st-order ambisonic input signal, in keeping only the W channel and, for an ambisonic input signal of order >1, in keeping only the first 4 ambisonic components W, X, Y, Z (therefore in truncating the signal to the 1st order). Other types of downmix (selection of a subset of channels and/or matrixing, use of "delay-sum beamforming") may be implemented without this modifying the method according to the invention.

Block 111 codes the audio signal $b'_k$, k=1, . . . , $K_{dmx}$ (where $K_{dmx} \leq K$) of B' at the output of block 110.

In one preferred embodiment, block 111 uses multi-mono coding (COD) with a variable allocation, in which the core codec is the standard 3GPP EVS codec. In this multi-mono approach, each channel $b'_k$ is coded separately by one instance of the codec; however, in some variants, other coding methods are possible, for example multi-stereo coding or joint multichannel coding. This therefore gives, at the output of this coding block 111, at least one coded channel of an audio signal resulting from the original multichannel signal, in the form of a bitstream that is sent to the multiplexer 140.

Block 120 extracts a given frequency band (which may correspond to the full-band signal or in a restricted band) or carries out a division into multiple frequency sub-bands. In some variants, the extraction of a given band or the division into sub-bands may reuse equivalent processing operations performed in blocks 110 or 111.

In general, the division into sub-bands may be uniform or non-uniform.

In one preferred embodiment, when the signal is not coded in a frequency band, the channels of the original multichannel audio signal are divided into frequencies using frequency intervals defined on the Bark scale.

The Bark scale is defined over the following 24 intervals (in Hz) for a signal sampled at 32 kHz:

[20, 100], [100, 200], [200, 300], [300, 400], [400, 510], [510, 630], [630, 770], [770, 920], [920, 1080], [1080, 1270], [1270, 1480], [1480, 1720], [1720, 2000], [2000, 2320], [2320, 2700], [2700, 3150], [3150, 3700], [3700, 4400], [4400, 5300], [5300, 6400], [6400, 7700], [7700, 9500], [9500, 12000], [12000, 16000]

This predefined division may be modified for the case of a sampling frequency in order to use a different number of bands, for example by keeping only 21 bands at 16 kHz and by changing the last interval to [6400, 8000] or by adding a band [16000, 20000] at 48 kHz. This division into sub-bands, which is implemented in the domain of the short-term discrete Fourier transform (STFT) computed on 20 ms frames with windowing over 30 ms (10 ms of signal passed), is tantamount to band-pass filtering in the Fourier domain. In some variants, it is possible to apply a filter bank with or without critical sampling in order to obtain real or complex signals corresponding to the sub-bands. It will be noted that the operation of dividing into sub-bands generally involves a processing delay that depends on the type of filter bank that is implemented; according to the invention, temporal alignment may be applied before or after coding-decoding and/or before the extraction of spatial image information, such that the spatial image information is well temporally synchronized with the corrected signal.

The remainder of the description describes the various coding and decoding steps as though a processing operation in the complex frequency domain were involved. The actual case is also described as a variant.

Block 121 determines (Inf. B) information representative of a spatial image of the original multichannel signal.

In the embodiment described here, the information representative of the spatial image of the original multichannel signal is a covariance matrix of the input channels B in each frequency band predetermined by block 120. It will be noted here that, for simplicity, the description does not distinguish here the sub-band index for the matrix C. In the preferred embodiment, the invention is implemented in a complex-value transform domain, the covariance being computed as follows:

$$C=Re(B\cdot B^H)$$

to within a normalization factor.

This matrix is computed as follows in the real case:

$$C=B\cdot B^T$$

to within a normalization factor.

In the cases of a multichannel signal in the time domain, the covariance may be estimated recursively (sample by sample) in the following form:

$$Cij(n)=n/(n+1)Cij(n-1)+1/(n+1)bi(n)bj(n).$$

In some variants, operations of temporally smoothing the covariance matrix may be used.

In some variants, the covariance matrix C may be regularized before quantization in the form C+εI or by applying thresholding to the diagonal coefficients of C in order to ensure a minimum value ε (for example $\varepsilon=10^{-9}$ if the input ambisonic signals are amplitude-normalized over the interval +/−1).

The covariance matrix C (of size K×K) is, by definition, symmetric, K being the number of ambisonic components.

Block 130 quantizes the coefficients of the matrix.

Figure 3A:
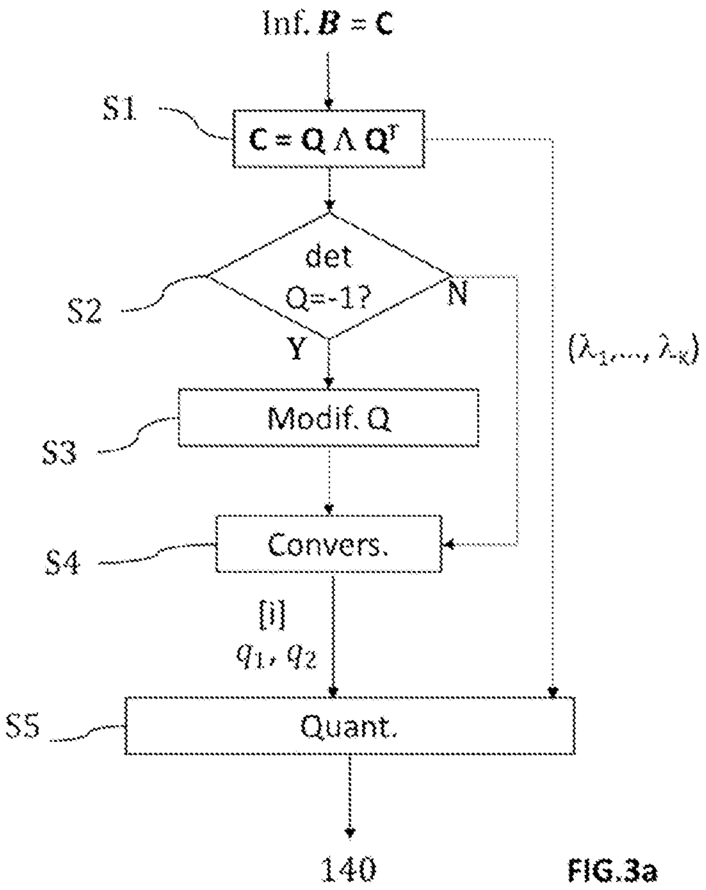
FIG. 3*a* illustrates, in the form of a flowchart, one embodiment of the coding block of the covariance matrix according to one embodiment of the invention.

FIG. 3*a* illustrates the steps implemented by block 130 to quantize the coefficients of a covariance matrix according to one embodiment of the invention.

Thus, according to the invention, the covariance matrix is coded using the following steps:

It is assumed at this stage that the covariance matrix has been estimated and that it has been modified (regularized) in order to ensure that no eigenvalue is zero. This may be achieved by replacing the values Cii of the diagonal of C with Cii=max(Cii, ε), where ε is a low value fixed for example at $10^{-9}$ (if the values of the ambisonic signal in the time domain are defined in the interval +/−1). In some variants, it is possible to modify the matrix C=C+εI, where I is the identity matrix.

The covariance matrix C (thus regularized) is decomposed into eigenvalues in step S1, in the form: $C=Q\Lambda Q^T$ where Q is an orthogonal matrix (with in particular det Q=+/−1) and $\Lambda=\text{diag}(\lambda_1, \ldots, \lambda_K)$ is a diagonal matrix of eigenvalues. Without loss of generality, it is assumed that $\lambda_1 \geq \ldots \geq \lambda_K \geq 0$. It will be noted that the regularization of C, if applied, guarantees that the eigenvalues are strictly positive.

Multiple methods are known from the prior art for carrying out this factorization: (iterative) QR decomposition, Householder transformation, Givens rotations or variants of these methods, such as the "sorted QR" decomposition. It does not matter which method is chosen if the eigenvalues $\lambda_i$ (i=1 . . . K) are not positive and are not ordered in descending order, according to the invention, if $\lambda_i<0$, the sign of $\lambda_i$ and of the associated eigenvector will be inverted; the eigenvalues will also be permuted if necessary in order to comply with the constraint $\lambda_1 \geq \ldots \geq \lambda_K \geq 0$ by applying the same permutations to the eigenvectors (columns) in Q.

In step S2, the determinant of the matrix of eigenvectors Q is computed and it is determined whether det Q=−1. If this is the case (Y in step S2), Q is modified in step S3, preferably by inverting the sign of the eigenvector associated with the lowest eigenvalue so as to obtain a rotation matrix (orthogonal, unitary matrix with det Q=+1). The matrix of vectors Q is therefore called "rotation matrix" below after step S2.

For the case of the planar FOA (three channels), step S2 is adapted to compute a determinant of size 3×3 and, for the ambisonic of the FOA (4 channels), a determinant of a 4×4 matrix is used. One exemplary embodiment is given for the 4×4 case in APPENDIX 3.

In step S4, the matrix Q resulting from step S3 or from step S1 is converted, depending on the value of the determinant in step S2. This conversion takes place either in the domain of Euler angles (K=3) or generalized Euler angles (K>4), or in the domain of quaternions in the case of the FOA (K=3 or 4).

The conversion into Euler angles (for K=3) is for example given in Appendix I of the article by K. Shoemake, Animating Rotation with Quaternion Curves Proc. SIG-GRAPH 1985, p. 245-254. It will be recalled that there are variants for defining the Euler angles according to the chosen axes of rotation (X,Y,Z) and according to whether or not the axes are fixed. In some variants of the invention, it is possible to use variants for defining the Euler angles other than the one adopted in the article by K. Shoemake for the conversion.

The conversion into generalized Euler angles (for K>3) is for example detailed in the article D. K. Hoffman, R. C. Raffenetti, and K. Ruedenberg, "Generalization of Euler Angles to N-Dimensional Orthogonal Matrices," Journal of Mathematical Physics, vol. 13, no. 4, pp. 528-533, 1972. This parametrization based on generalized Euler angles is general and applies to any dimension.

In some variants, in the case K=3, it is possible to convert the rotation matrix Q (after steps S1 and S2) into a single unit quaternion. One exemplary embodiment is given in Appendix I of the article by Ken Shoemake, Animating Rotation with Quaternion Curves Proc. SIG-GRAPH 1985, p. 245-254.

In the case K=4, a double unit quaternion parametrization of Q is also possible; the double quaternion conversion is given for example in the article P. Mahé, S. Ragot, S. Marchand, "First-Order Ambisonic Coding with PCA Matrixing and Quaternion-Based Interpolation", Proc. DAFx, Birmingham, UK, September 2019.

In step S5, the parameters obtained in step S4 are quantized. For Euler angles (K=3) or generalized Euler angles (K>3), denoted in APPENDIX 1 as angles [i] (i=1, . . . , 6 for the example K=4), in the preferred embodiment, a scalar quantization is applied for example with a quantization step (denoted in APPENDIX 1 as "stepSize") that is identical for each angle. A budget of 5 and 6 bits for an interval of length $\pi$ and $2\pi$ is defined, for example, thereby giving a budget of 33 bits for 6 generalized Euler angles. A pseudo-code carrying out this quantization operation is given in APPENDIX 1. In the case K=3, with 3 Euler angles, there would be for example a budget of 17 bits (6+6+5 bits for 2 angles defined over an interval of length $2\pi$ and an angle over an interval of length $\pi$). In some variants, other methods for quantizing Euler angles may be used.

In the case K=3, if the rotation matrix Q is converted into a single unit quaternion, this quaternion is preferably coded with a hemispherical spherical vector quantization dictionary in dimension 4. In one exemplary embodiment, the vertices of a polytope of dimension 4 may be taken, preferably using the vertices of a truncated (7200 vertices) or omnitruncated (14400 vertices) 600-cell as defined in the literature or even the 7200 vertices of a "120-cell snub" whose code words (coordinates in dimension 4) are available for example in:

http://paulbourke.net/geometry/hyperspace/120cell_snub.ascii.gz (beginning of the file, lines 2-7201).

Spherical vector quantization is carried out by simple comparison by scalar product in dimension 4 with code words (typically normalized to a unit norm equal to 1). The exhaustive search for the nearest neighbor may be carried out efficiently by taking into account the possible permutations of one and the same code word in the dictionary. According to the invention, it is possible to truncate the dictionary into a hemisphere in order to retain, in the search for the nearest neighbor, only the code words whose last (fourth) component is positive (or negative according to the alternative convention that may be used in some variants). In some variants, the truncation by the sign may be carried out on one of the other three components of the unit quaternion. In some variants, the quantization dictionary might not be truncated to a hemisphere.

No reminder is given here of the known principles of spherical vector quantization with the use of "leaders", which are for example defined in the article by C. Lamblin and J.-P. Adoul, Algorithme de quantification vectorielle sphérique à partir du réseau de Gosset d'ordre 8. [Spherical vector quantization algorithm based on 8th-order Gosset lattice] Ann. Télécommun., vol. 43, no. 3-4, pp. 172-186, 1988 (Lamblin, 1988). Here, the scalar product is computed for all elements in the dictionary (with or without restriction to the hemisphere) and the number of computations may be equivalently reduced to a subset by listing the signed or unsigned "leaders" in a pre-computed table. The computation of the quantization index is given either by the index in the exhaustive table or by the addition of a permutation index and a cardinality offset, according to approaches known to those skilled in the art. One example of spherical quantization (which may be easily adapted) is found in clause 6.6.9 of ITU-T Recommendation G.729.1.

In the case K=4, in the case of double quaternions, the pair of unit quaternions $q_1$ and $q_2$ is quantized by a spherical quantization dictionary in dimension 4; by convention, $q_1$ is quantized with a hemispherical dictionary (because $q_1$ and $-q_1$ correspond to one and the same 3D rotation) and $q_2$ is quantized with a spherical dictionary. Examples of dictionaries may be given by predefined points in polyhedra of dimension 4. The quantization dictionaries for $q_1$ and $q_2$ may be interchanged for the quantization. The quantization is implemented as explained above by repeating the case K=3 for $q_1$ and $q_2$ with a hemispherical and a spherical dictionary.

In step S5, the matrix of eigenvalues is also coded. According to the invention, the eigenvalues are ordered such that $$\lambda_1 \geq \ldots \geq \lambda_K \geq 0$$

In one exemplary embodiment, a differential scalar quantization on a logarithmic scale is used.

One example of quantization is that of coding $\lambda_1$ in absolute terms on 5 bits, and then coding the difference (in dB) between $\lambda_k$ and $\lambda_{k-1}$ on 3 bits, that is to say a budget of 17 bits for K=4. One exemplary embodiment is given in APPENDIX 4 using a logarithm in base 2—in some variants, a base 10 (or other base) may be used. In some variants, other implementations of the logarithmic scalar quantization may be used.

It is also possible to use a vector quantization after having converted the eigenvalues into the logarithmic domain, for example by using a Pyramidal Vector Quantization (PVQ) described in the article T. Fischer, "A pyramid vector quantizer," IEEE transactions on information theory, vol. 32, no. 4, p. 568-583, 1986, or in variants (as in the Opus codec defined in IETF RFC 6716). Vector quantization uses only one quadrant of the possible code words because the eigenvalues are positive and ordered, and therefore code word indexing is able to be simplified to account for these two constraints. For the case of PVQ, one preferred exemplary embodiment scales the eigenvalues before applying the search to a pyramid face of dimension 4.

In some variants, it is possible to normalize the eigenvalues so as to code only K−1 normalized eigenvalues $\lambda_2/\lambda_1, \ldots, \lambda_K/\lambda_1$. A scalar quantization is then used on a logarithmic scale on 14 bits for K=4. In this case, the same normalization constraint should be applied to the decoding on the covariance matrix computed on the decoded signal. The exemplary embodiment may be adapted to code differential indices directly.

In some variants, the eigenvalues resulting from the decomposition of the matrix C may be quantized predictively using an inter-frame or intra-frame prediction. In other variants, if the coding uses a division into multiple sub-bands, it is possible to use a joint quantization of the eigenvalues of all of the sub-bands.

The quantization indices of the rotation matrix and of the matrix of eigenvalues are sent to the multiplexer (block 140).

The quantized values (index_angle[i], etc.) are sent to the multiplexer 140.

In the exemplary implementation for the 4-channel FOA case (with 6 generalized Euler angles coded on 33 bits and 4 eigenvalues coded on 17 bits), this therefore gives a budget of 50 bits (that is to say 2.5 kbit/s) to code a covariance matrix of size 4×4 in each sub-band. By way of example, if a division into sub-bands is defined with respectively 4, 6, 12 or 24 sub-bands and if a covariance matrix is transmitted for each of the sub-bands, this gives a rate of "meta-data" describing the spatial image of 10, 15, 30, or 60 kbit/s.

The decoder illustrated in FIG. 1 receives, in the demultiplexer block 150, a bitstream comprising at least one coded channel of an audio signal originating from the original multichannel signal and the information representative of a spatial image in at least one frequency band (a sub-band or single band that may cover up to the Nyquist band) of the original multichannel signal.

Block 160 decodes (Q−1) the covariance matrix in each band or sub-band defined by the encoder or other information representative of the spatial image of the original signal. In order not to overload the notations, the decoded covariance matrix is also denoted C like in the encoder.

Figure 3B:
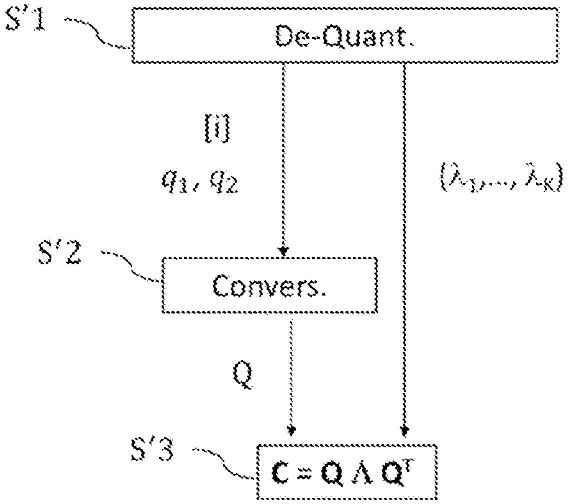
FIG. 3*b* illustrates, in the form of a flowchart, one embodiment of the decoding block of the covariance matrix according to one embodiment of the invention.

Block 160 implements the steps illustrated in FIG. 3*b* in order to decode the covariance matrix. The steps depend on the parameterization used at the encoder.

If the matrix Q has been coded in the domain of generalized Euler angles, block 160 may decode, in S'1, the quantization indices of the generalized Euler angles. In the (4-channel) FOA case, the pseudo-following one is given in APPENDIX 2. The same approach is easily adapted to the case of three Euler angles for K=3 or in the general case K>3.

If the matrix Q has been coded in the domain of quaternions, the one or more quantization indices, corresponding for example to a code word in a quantization dictionary in dimension 4, is or are decoded (possibly restricted to one hemisphere by restricting the sign of one of the components of the unit quaternion in the dictionary).

In step S'2, block 160 reconstructs the decoded matrix Q by applying the conversion of generalized Euler angles or one or more quaternions to a rotation matrix, for example in accordance with the abovementioned articles for the encoder portion.

The eigenvalues are also decoded in S'1, so as to obtain $\Lambda=\mathrm{diag}(\lambda_1, \ldots, \lambda_K)$, and then the covariance matrix is computed in step S'3: $C=Q\Lambda Q^T$.

Block 170 of FIG. 1 decodes (DEC) the audio signal as represented by the bitstream.

The decoding implemented in block 170 makes it possible to obtain a decoded audio signal $\hat{B}'$, which is sent as input to upmix block 171. Block 171 thus implements a step (UPMIX) of increasing the number of channels. In one embodiment of this step, for the channel of a mono signal $\hat{B}'$, this consists in convolving the signal $\hat{B}'$ using various spatial impulse responses that implement power-normalized all-pass decorrelator filters on the various channels of the signal $\hat{B}'$. In some variants, the signal $\hat{B}'$ may also be convolved using spatial room impulse responses (SRIR); these SRIRs are set to the original ambisonic order of B. In other variants, the decorrelation will be implemented in a transformed domain or in sub-bands (by applying a real or complex filter bank).

The upmix will add a number of channels $K_{up}$ so as to obtain $K_{dmx}+K_{up}=K$, where K is the number of channels of the original signal. In one particular embodiment, with an FOA downmix signal, $K_{dmx}=1$ (the W channel) and $K_{up}=3$.

Block 172 implements a step (SB) of dividing into sub-bands in a transformed domain. In some variants, a filter bank may be applied in order to obtain signals in the time or frequency domain. A reverse step, in block 191, recombines the sub-bands in order to reconstruct a decoded signal at output.

In the preferred embodiment, the decorrelation of the signal (block 171) is implemented before the division into sub-bands (block 172), but it is entirely possible, in some variants, to interchange these two blocks. The only condition to be verified is that of ensuring that the decorrelation is adapted to the predefined band or sub-bands.

Block 175 determines (Inf $\hat{B}$) information representative of a spatial image of the decoded multichannel signal in a manner similar to what was described for block 121 (for the original multichannel signal), this time applied to the decoded multichannel signal $\hat{B}$ obtained at output of block 171.

Similarly to what was described for block 121, in one embodiment, this information is a covariance matrix of the channels of the decoded multichannel signal.

In one embodiment, in the STFT domain, the complex case will be used in which $\hat{C}=\mathrm{Re}(\hat{B}\cdot\hat{B}^H)$ to within a normalization factor.

This covariance matrix is obtained as follows in the real case:

$\hat{C}=\hat{B}\cdot\hat{B}^T$ to within a normalization factor.

The matrices $\hat{C}$ may optionally be normalized by the term $\hat{C}_{11}$ associated with the W channel, if a similar normalization is applied to the matrix C.

In some variants, operations of temporally smoothing the covariance matrix may be used. In the cases of a multichannel signal in the time domain, the covariance may be estimated recursively (sample by sample).

In some variants, the covariance matrix $\hat{C}$ of the decoded signal may be decomposed into eigenvalues (ordered as in the encoder) and the eigenvalues may be normalized by the largest eigenvalue.

From the information representative of the spatial images of the original multichannel signal (Inf. B) and of the decoded multichannel signal (Inf. $\hat{B}$), respectively, for example, the covariance matrices C and $\hat{C}$, block 180 implements a step of determining (Det.Corr) a set of corrections per sub-band (in at least one band).

For this purpose, a transformation matrix T to be applied to the decoded signal is determined, such that the spatial image modified after applying the transformation matrix T to the decoded signal $\hat{B}$ is the same as that of the original signal B.

Figure 2:
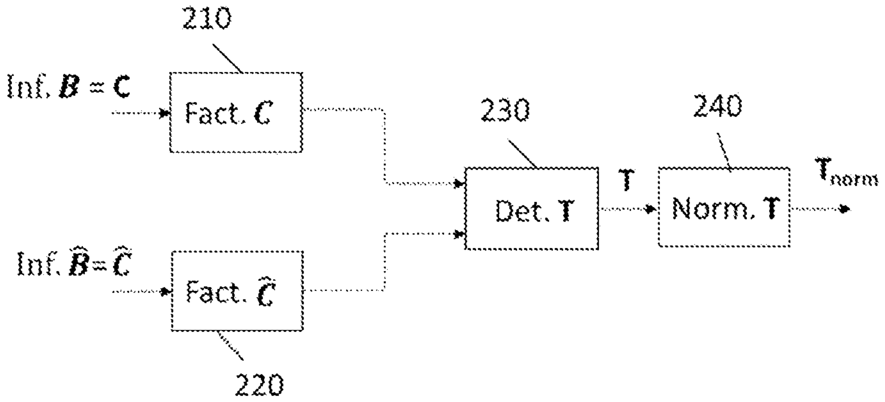
FIG. 2 illustrates a detailed embodiment of the block for determining the set of corrections.

FIG. 2 illustrates this determination step implemented by block 180. In this embodiment, it is considered that the information representative of the spatial image of the original multichannel signal and of the decoded multichannel signal is formed by the respective covariance matrices C and $\hat{C}$.

What is sought is therefore a matrix T that satisfies the following equation: $T \cdot \hat{C} \cdot T^T = C$ where $C = B \cdot B^T$ is the covariance matrix of B and $\hat{C} = \hat{B} \cdot \hat{B}^T$ is the covariance matrix of $\hat{B}$, in the current frame.

In this embodiment, a factorization known as a Cholesky factorization is used to solve this equation.

Given a matrix A of size n×n, the Cholesky factorization consists in determining a (lower or upper) triangular matrix L such that $A = LL^T$ (real case) and $A = LL^H$ (complex case). For the decomposition to be possible, the matrix A should be a positive definite symmetric matrix (real case) or positive definite Hermitian matrix (complex case); in the real case, the diagonal coefficients of L are strictly positive.

In the real case, a matrix M of size n×n is said to be positive definite symmetric if it is symmetric ($M^T = M$) and positive definite ($x^T M x > 0$ for any value of $x \in R^n \setminus \{0\}$).

For a symmetric matrix M, it is possible to verify that the matrix is positive definite if all of its eigenvalues are strictly positive ($\lambda_i > 0$) If the eigenvalues are positive ($\lambda_i \geq 0$) the matrix is said to be positive semi-definite.

A matrix M of size n×n is said to be positive definite symmetric Hermitian if it is Hermitian ($M^H = M$) and positive definite ($z^H M z$ is a real >0 for any value of $z \in C^n \setminus \{0\}$).

The Cholesky factorization is for example used to find a solution to a system of linear equations of the type Ax=b. For example, in the complex case, it is possible to transform A into $LL^H$ using the Cholesky factorization, to solve Ly=b and then to solve $L^H x = y$.

In equivalent fashion, the Cholesky factorization may be written as $A = U^T U$ (real case) and $A = U^H U$ (complex case), where U is an upper triangular matrix.

In the embodiment described here, without loss of generality, only the case of a Cholesky factorization with a triangular matrix L is dealt with.

The Cholesky factorization thus makes it possible to decompose a matrix $C = L \cdot L^T$ into two triangular matrices on the condition that the matrix C is positive definite symmetric. This gives the following equation:

$$T \cdot \hat{L} \cdot \hat{L}^T T^T = L \cdot L^T.$$

Identification is used to find:

$$T \cdot \hat{L} = L$$

That is to say:

$$T = L \cdot L^{-1}$$

Since the covariance matrices C and $\hat{C}$ are generally positive semi-definite matrices, the Cholesky factorization cannot be used as such.

It will be noted here that, when the matrices L and L are lower (respectively upper) triangular, the transformation matrix T is also lower (respectively upper) triangular.

Block 210 thus forces the covariance matrix C to be positive definite. This modification of the matrix C may be omitted for the decoded covariance matrix if the quantization guarantees that the eigenvalues are indeed non-zero. If it is used, it is possible to replace the values of the diagonal Cii with max(Cii, ε), where ε is a low value fixed for example at $10^{-9}$ (if the values of the ambisonic signal in the time domain are defined in the interval +/−1). In some variants, ε is added (Fact. C for factorization of C) to the coefficients of the diagonal of the matrix in order to guarantee that the matrix is actually positive definite: $C = C + \varepsilon I$, and I is the identity matrix.

Similarly, block 220 forces the covariance matrix $\hat{C}$ to be positive definite, by replacing the values of the diagonal Cii with max(Cii, ε), where ε is a low value fixed for example at $10^{-9}$ (if the values of the ambisonic signal in the time domain are defined in the interval +/−1) or by modifying this matrix in the form $\hat{C} = \hat{C} + \varepsilon I$. In the preferred embodiment, this conditioning of the covariance matrices is preferably integrated into the blocks 121 (at the encoder) for the matrix C and 175 (at the decoder) for the matrix $\hat{C}$.

Once the two covariance matrices C and $\hat{C}$ are conditioned (regularized) to be positive definite, block 230 computes the associated Cholesky factorizations and finds (Det.T) the optimum transformation matrix T in the form $$T = L \cdot \hat{L}^{-1}.$$

In this embodiment, it is possible for the relative difference in energy between the decoded ambisonic signal and the corrected ambisonic signal to be very large, in particular at high frequencies, which may be strongly deteriorated by encoders such as multi-mono EVS coding. In order to avoid excessively amplifying certain frequency areas, a regularization term may be added. Block 240 optionally takes responsibility for normalizing (Norm. T) this correction.

In the preferred embodiment, a normalization factor is therefore computed so as not to amplify frequency areas.

From the covariance matrix $\hat{C}$ of the coded and then decoded multichannel signal and from the transformation matrix T, it is possible to compute the covariance matrix of the corrected signal as:

$$R = T \cdot \hat{C} \cdot T^T$$

Only the value of the first coefficient $R_{00}$ of the matrix R, corresponding to the omnidirectional component (W channel), is retained in order to be applied, as normalization factor, to T and avoid an increase in the overall gain due to the correction matrix T:

$$\hat{B}_{corr} == T_{norm} \cdot \hat{B}$$

$$T_{norm} = g_{norm} \cdot T$$

$$g_{norm} = \sqrt{\hat{C}_{00} / R_{00}}$$

with where $\hat{C}_{00}$ corresponds to the first coefficient of the covariance matrix of the decoded multichannel signal.

In some variants, the normalization factor $g_{norm}$ may be determined without computing the whole matrix R, since it is enough to compute only a subset of matrix elements in order to determine $R_{00}$ (and therefore $g_{norm}$).

The matrix T or $T_{norm}$ thus obtained in each band or sub-band corresponds to the corrections to be made to the decoded multichannel signal in block 190 of FIG. 1.

Block 190 performs the step of correcting the decoded multichannel signal by applying, in each band or sub-band, the transformation matrix T or $T_{norm}$ directly to the decoded multichannel signal, in the ambisonic domain (preferably in the transformed domain), in order to obtain the corrected output ambisonic signal ($\hat{B}$ corr).

Even though the invention applies to the ambisonic case, in some variants, it is possible to convert other formats (multichannel, object, etc.) into ambisonic in order to apply the methods implemented according to the various embodiments described. One exemplary embodiment of such a conversion from a multichannel or object format to an ambisonic format is described in FIG. 2 of the 3GPP TS 26.259 specification (v15.0.0).

Figure 4:
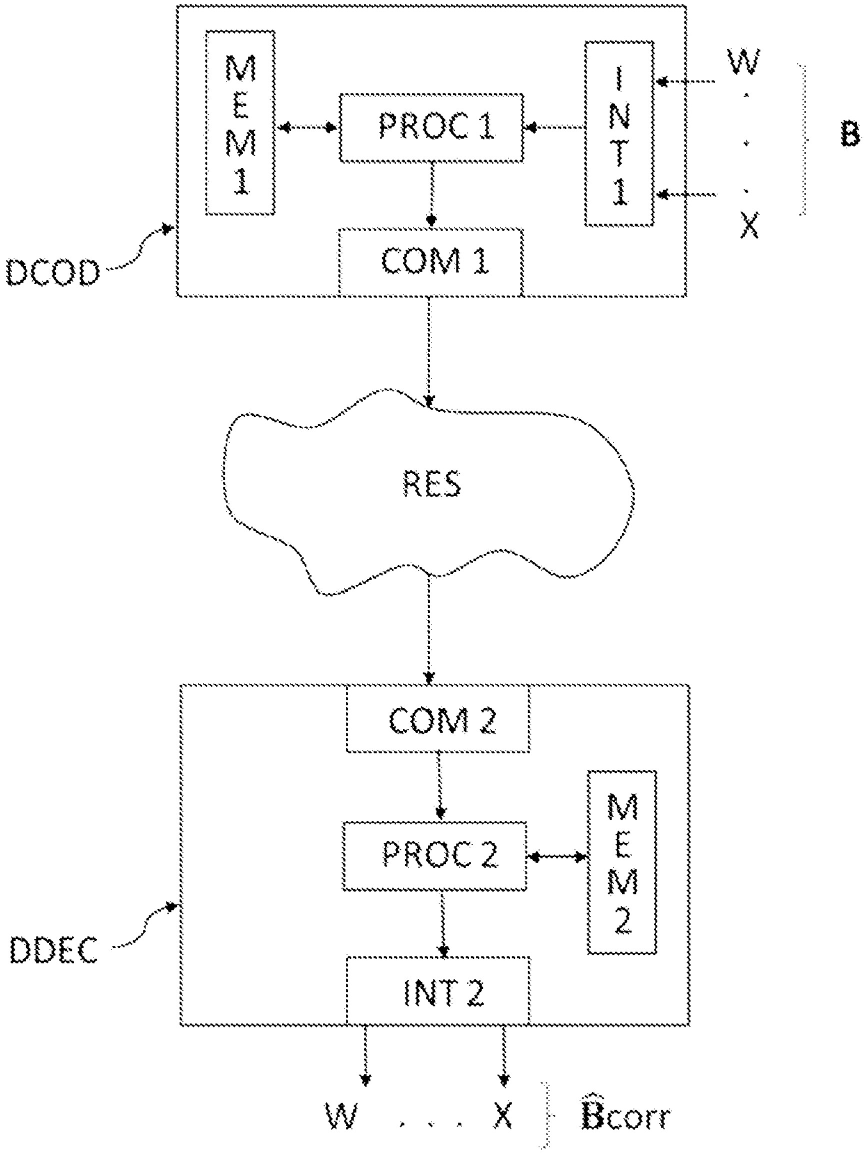
FIG. 4 illustrates examples of a structural embodiment of an encoder and a decoder according to one embodiment of the invention.

FIG. 4 illustrates a coding device DCOD and a decoding device DDEC, within the sense of the invention, these devices being dual to each other (in the sense of "reversible") and connected to one another by a communication network RES.

The coding device DCOD comprises a processing circuit typically including:

- a memory MEM1 for storing instruction data of a computer program within the sense of the invention (these instructions possibly being distributed between the encoder DCOD and the decoder DDEC);
- an interface INT1 for receiving an original multichannel signal B, for example an ambisonic signal distributed over various channels (for example four 1st-order channels W, Y, Z, X) with a view to compression-coding it within the sense of the invention;
- a processor PROC1 for receiving this signal and processing it by executing the computer program instructions stored in the memory MEM1, with a view to coding it; and
- a communication interface COM 1 for transmitting the coded signals via the network.

The decoding device DDEC comprises its own processing circuit, typically including:

- a memory MEM2 for storing instruction data of a computer program within the sense of the invention (these instructions possibly being distributed between the encoder DCOD and the decoder DDEC, as indicated above);
- an interface COM2 for receiving the coded signals from the network RES with a view to compression-decoding them within the sense of the invention;
- a processor PROC2 for processing these signals by executing the computer program instructions stored in the memory MEM2, with a view to decoding them; and
- an output interface INT2 for delivering the corrected decoded signals ($\hat{B}$ Corr), for example in the form of ambisonic channels W . . . X, with a view to rendering them.

Of course, this FIG. 4 illustrates one example of a structural embodiment of a codec (encoder or decoder) within the sense of the invention. FIGS. 1 to 3, commented on above, describe more functional embodiments of these codecs in detail.

APPENDIX 1 min_angle[6]={−PI_2,−PI_2,−PI,−PI_2,−PI,−PI} max_angle[6]={PI_2,PI_2,PI,PI_2,PI,PI} excess_bit[6]={0,0,1,0,1,1} bits=5+v_excess_bit[i]

stepSize=(max_angle[i]−min_angle[i])/(1<<bits)

index_angle[i]=int((angles[i]−min_angle[i])/stepSize)+0.5)

index_angle[i]=index_angle[i] % (1<<bits)

APPENDIX 2 min_angle[6]={−PI_2,−PI_2,−PI,−PI_2,−PI,−PI} max_angle[6]={PI_2,PI_2,PI,PI_2,PI,PI} excess_bit[6]={0,0,1,0,1,1} bits=5+v_excess_bit[i]

stepSize=(max_angle[i]−min_angle[i])/(1<<bits)

angles_q[i]=index*stepSize+min_angle[i]

APPENDIX 3

Computation of the determinant d=det M in literal form for a matrix M=[aij] of size 4×4:

d=a11*a22*a33*a44+a11*a24*a32*a43+a11*a23*a34*a42−a11*a24*a33*a42−a11*a22*a34*a43−a11*a23*a32*a44−a12*a21*a33*a44−a12*a23*a34*a41−a12*a24*a31*a43+a12*a24*a33*a41+a12*a21*a34*a43+a12*a23*a31*a44+a13*a21*a32*a44+a13*a22*a34*a41+a13*a24*a31*a42−a13*a24*a32*a41−a13*a21*a34*a42−a13*a22*a31*a44-a14*a21*a32*a43-a14*a22*a33*a41−a14*a23*a31*a42+a14*a23*a32*a41+a14*a21*a33*a42+a14*a22*a31*a43

APPENDIX 4

Assuming conditioning of matrix C by $\varepsilon=10^{-9}$ (the interval of the indices is adapted as a function of this value):

Quantization:

index_val[i]=round(½ log 2(λi)), i=1, . . . ,K−1 index_val[i]=clip(index_val[i],[−15,37]) # saturation in the interval [−15,37]

diff_index_val[i]=index_val[i]−index[i−1], i=2 . . . K−1 diff_index_val[i]=clip(diff_index_val[i],[0,7]) # saturation in the interval [0,7]

Decoding:

index_val[i]=index_val[i−1]+diff_index[i], i=2 . . . K−1

$\lambda i=2^{1/2\ index\_val[i]}$

Although the present disclosure has been described with reference to one or more examples, workers skilled in the art will recognize that changes may be made in form and detail without departing from the scope of the disclosure and/or the appended claims.

The invention claimed is:

1. A method for coding an original multichannel sound signal, the method being implemented by a coding device and comprising: coding at least one audio signal channel originating from the original multichannel sound signal;

extracting from the original multichannel sound signal at least one frequency band;

determining a covariance matrix per extracted frequency band, representative of a spatial image of the original multichannel sound signal;

decomposing the determined covariance matrices into eigenvalues using the following steps:

obtaining a matrix of eigenvectors Q such that $C=Q\Lambda Q^T$, where C is the covariance matrix and $\Lambda=\text{diag}(\lambda 1, \ldots, \lambda_K)$ is a diagonal matrix of eigenvalues;

modifying the matrix of eigenvectors as a function of a determinant value of the matrix of eigenvectors Q;

converting the matrix of eigenvectors Q into the domain of generalized Euler angles; and coding by quantizing parameters resulting from the decomposition into the eigenvalues of the determined covariance matrices, the generalized Euler angles that are obtained forming part of the parameters to be quantized.

2. The method as claimed in claim 1, wherein the eigenvalues forming part of the parameters to be quantized, are ordered before quantization and the quantizing of the eigenvalues is performed by a differential scalar quantization.

3. The method as claimed in claim 1, wherein the generalized Euler angles are quantized by uniform quantization.

4. A method for coding an original multichannel sound signal, the method being implemented by a coding device and comprising:

coding at least one audio signal channel originating from the original multichannel sound signal;

extracting from the original multichannel sound signal at least one frequency band;

determining a covariance matrix per extracted frequency band, representative of a spatial image of the original multichannel sound signal;

decomposing the determined covariance matrices into eigenvalues using the following steps:

obtaining a matrix of eigenvectors Q such that $C=Q\Lambda Q^T$, where C is the covariance matrix and $\Lambda=\text{diag}(\lambda 1, \ldots, \lambda_K)$ is a diagonal matrix of eigenvalues;

modifying the matrix of eigenvectors as a function of a determinant value of the matrix of eigenvectors Q;

converting the matrix of eigenvectors Q into the domain of quaternions;

coding by quantizing parameters resulting from the decomposition into the eigenvalues of the determined covariance matrices, at least one quaternion that is obtained forming part of the parameters to be quantized.

5. The method as claimed in claim 4, wherein the quaternions are quantized by spherical vector quantization.

6. The method as claimed in claim 4, wherein the eigenvalues forming part of the parameters to be quantized, are ordered before quantization and the quantizing of the eigenvalues is performed by a differential scalar quantization.

7. A method for decoding an original multichannel sound signal, the method being implemented by a decoding device and comprising:

decoding at least one coded channel of the original multichannel sound signal and obtaining a decoded multichannel signal;

extracting from the decoded multichannel signal at least one frequency band;

decoding parameters resulting from a decomposition of covariance matrices of the original multichannel sound signal into eigenvalues;

determining the covariance matrices of the original multichannel sound signal from the decoded parameters;

determining a covariance matrix, per extracted frequency band, of the decoded multichannel signal;

determining a set of corrections to be made to the decoded signal based on the covariance matrices of the original multichannel sound signal and the covariance matrices of the decoded multichannel signal; and correcting the decoded multichannel signal using the determined set of corrections.

8. A coding device comprising:

a processing circuit configured to code an original multichannel sound signal by:

coding at least one audio signal channel originating from the original multichannel sound signal;

extracting from the original multichannel sound signal into at least one frequency band;

determining a covariance matrix per extracted frequency band, representative of a spatial image of the original multichannel sound signal;

decomposing the determined covariance matrices into eigenvalues using the following steps:

obtaining a matrix of eigenvectors Q such that $C=Q\Lambda Q^T$, where C is the covariance matrix and $\Lambda=\text{diag}(\lambda 1, \ldots, \lambda_K)$ is a diagonal matrix of eigenvalues;

modifying the matrix of eigenvectors as a function of a determinant value of the matrix of eigenvectors Q;

converting the matrix of eigenvectors Q into the domain of generalized Euler angles; and coding by quantizing the-parameters resulting from the decomposition into the eigenvalues of the determined covariance matrices, the generalized Euler angles that are obtained forming part of the parameters to be quantized.

9. The coding device as claimed in claim 8, wherein the processing circuit comprises:

a processor; and a non-transitory computer readable medium comprising instructions stored thereon which when executed by the processor configure the coding device to code the multichannel sound signal.

10. A decoding device comprising:

a processing circuit configured to decode an original multichannel sound signal by:

decoding at least one coded channel of the original multichannel sound signal and obtaining a decoded multichannel signal;

extracting from the decoded multichannel signal at least one frequency band;

decoding parameters resulting from a decomposition of covariance matrices of the original multichannel sound signal into eigenvalues;

determining the covariance matrices of the original multichannel sound signal from the decoded parameters;

determining a covariance matrix, per extracted frequency band, of the decoded multichannel signal;

determining a set of corrections to be made to the decoded signal based on the covariance matrices of the original multichannel sound signal and the covariance matrices of the decoded multichannel signal; and correcting the decoded multichannel signal using the determined set of corrections.

11. The decoding device as claimed in claim 10, wherein the processing circuit comprises:

a processor; and a non-transitory computer readable medium comprising instructions stored thereon which when executed by the processor configure the decoding device to decode the multichannel sound signal.

12. A non-transitory computer readable storage medium storing a computer program comprising instructions for executing a method of coding an original multichannel sound signal when the instructions are executed by a processing circuit of a coding device, wherein the method comprises:

coding at least one audio signal channel originating from the original multichannel sound signal;

extracting from the original multichannel sound signal into at least one frequency band;

determining a covariance matrix per extracted frequency band, representative of a spatial image of the original multichannel sound signal;

decomposing the determined covariance matrices into eigenvalues using the following steps:

obtaining a matrix of eigenvectors Q such that $C=Q\Lambda Q^T$, where C is the covariance matrix and $\Lambda=\text{diag}(\lambda 1, \ldots, \lambda_K)$ is a diagonal matrix of eigenvalues;

modifying the matrix of eigenvectors as a function of a determinant value of the matrix of eigenvectors Q;

converting the matrix of eigenvectors Q into the domain of generalized Euler angles; and coding by quantizing parameters resulting from the decomposition into the eigenvalues of the determined covariance matrices, the generalized Euler angles that are obtained forming part of the parameters to be quantized.

13. A non-transitory computer readable storage medium storing a computer program comprising instructions for executing a method of decoding an original multichannel sound signal when the instructions are executed by a processing circuit of a decoding device, wherein the method comprises:

decoding at least one coded channel of the original multichannel sound signal and obtaining a decoded multichannel signal;

extracting from the decoded multichannel signal at least one frequency band;

decoding parameters resulting from a decomposition of covariance matrices of the original multichannel sound signal into eigenvalues;

determining the covariance matrices of the original multichannel sound signal from the decoded parameters;

determining a covariance matrix, per extracted frequency band, of the decoded multichannel signal;

determining a set of corrections to be made to the decoded signal based on the covariance matrices of the original multichannel sound signal and the covariance matrices of the decoded multichannel signal; and correcting the decoded multichannel signal using the determined set of corrections.

14. A coding device comprising:

a processing circuit configured to code an original multichannel sound signal by:

coding at least one audio signal channel originating from the original multichannel sound signal;

extracting from the original multichannel sound signal into at least one frequency band;

determining a covariance matrix per extracted frequency band, representative of a spatial image of the original multichannel sound signal;

decomposing the determined covariance matrices into eigenvalues using the following steps:

obtaining a matrix of eigenvectors Q such that $C=Q\Lambda Q^T$, where C is the covariance matrix and $\Lambda=\text{diag}(\lambda 1, \ldots, \lambda^K)$ is a diagonal matrix of eigenvalues;

modifying the matrix of eigenvectors as a function of a determinant value of the matrix of eigenvectors Q;

converting the matrix of eigenvectors Q into the domain of quaternions; and coding by quantizing parameters resulting from the decomposition into the eigenvalues of the determined covariance matrices, at least one quaternion that is obtained forming part of the parameters to be quantized.

15. The coding device as claimed in claim 14, wherein the processing circuit comprises:

a processor; and a non-transitory computer readable medium comprising instructions stored thereon which when executed by the processor configure the coding device to code the multichannel sound signal.

16. A non-transitory computer readable storage medium storing a computer program comprising instructions for executing a method of coding an original multichannel sound signal when the instructions are executed by a processing circuit of a coding device, wherein the method comprises:

coding at least one audio signal channel originating from the original multichannel sound signal;

extracting from the original multichannel sound signal into at least one frequency band;

determining a covariance matrix per extracted frequency band, representative of a spatial image of the original multichannel sound signal;

decomposing the determined covariance matrices into eigenvalues using the following steps:

obtaining a matrix of eigenvectors Q such that $C=Q\Lambda Q^T$, where C is the covariance matrix and $\Lambda=\text{diag}(\lambda 1, \ldots, \lambda_K)$ is a diagonal matrix of eigenvalues;

modifying the matrix of eigenvectors as a function of a determinant value of the matrix of eigenvectors Q;

converting the matrix of eigenvectors Q into the domain of quaternions; and coding by quantizing parameters resulting from the decomposition into the eigenvalues of the determined covariance matrices, at least one quaternion that is obtained forming part of the parameters to be quantized.

* * * * *